US012308546B2

(12) United States Patent
Raybold et al.

(10) Patent No.: US 12,308,546 B2
(45) Date of Patent: May 20, 2025

(54) CONNECTOR FOR A FLAT FLEXIBLE CABLE

(71) Applicant: TE Connectivity Solutions GmbH, Schaffhausen (CH)

(72) Inventors: Christopher Raybold, Middletown, PA (US); John Mark Myer, Middletown, PA (US); Ryan David Hetrick, Middletown, PA (US); Jeremy Patterson, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 363 days.

(21) Appl. No.: 17/873,225

(22) Filed: Jul. 26, 2022

(65) Prior Publication Data

US 2023/0056542 A1 Feb. 23, 2023

Related U.S. Application Data

(60) Provisional application No. 63/235,347, filed on Aug. 20, 2021.

(51) Int. Cl.

| | |
|---|---|
| ***H01R 12/79*** | (2011.01) |
| ***H01R 12/88*** | (2011.01) |
| ***H01R 13/627*** | (2006.01) |
| ***H01R 13/629*** | (2006.01) |

(52) U.S. Cl.

CPC ............ *H01R 12/79* (2013.01); *H01R 12/88* (2013.01); *H01R 13/6271* (2013.01); *H01R 13/629* (2013.01)

(58) Field of Classification Search

None

See application file for complete search history.

(56) References Cited

U.S. PATENT DOCUMENTS

| | | | | |
|---|---|---|---|---|
| 5,356,308 A * | 10/1994 | Toba | H01R 13/5219 | 439/495 |
| 6,280,217 B1 * | 8/2001 | Lin | H01R 12/79 | 439/495 |
| 6,431,907 B1 * | 8/2002 | Ma | H01R 12/79 | 439/495 |
| 6,746,269 B1 * | 6/2004 | Casses | H01R 4/2495 | 439/422 |
| 2022/0337001 A1 * | 10/2022 | Hetrick | H01R 12/613 | |
| 2022/0393379 A1 * | 12/2022 | Moll | H01R 12/69 | |

FOREIGN PATENT DOCUMENTS

WO 1998000887 A1 1/1998

OTHER PUBLICATIONS

International Search Report, International App. No PCT/IB2022/057836 International Filing Date Aug. 22, 2022.

* cited by examiner

*Primary Examiner* — Oscar C Jimenez

(57) ABSTRACT

A connector for a flat flexible cable includes a housing and a terminal disposed in the housing. The housing has a base and a cover. The base has a closed section with a receiving passageway and an open section extending from the closed section. The cover encloses the open section in a closed position of the cover. The cover has a main body with a pressing surface and a latch extending from the main body. The latch engages a catch of the base in the closed position. The terminal is disposed in the receiving passageway and has a tab extending into the open section. The pressing surface abuts the tab and presses the tab toward the base in the closed position.

22 Claims, 13 Drawing Sheets

CONNECTOR FOR A FLAT FLEXIBLE CABLE

CROSS-REFERENCE TO RELATED APPLICATIONS

This application claims priority under 35 U.S.C. § 119 to U.S. Provisional Patent Application No. 63/235,347, filed on Aug. 20, 2021.

FIELD OF THE INVENTION

The present invention relates to a connector and, more particularly, to a connector for a flat flexible cable.

BACKGROUND

Flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional "round wire" counter parts. Specifically, in addition to having a lower profile and lighter weight, FFCs enable the implementation of large circuit pathways with significantly greater ease compared to round wire-based architectures. As a result, FFCs are being considered for many complex and/or high-volume applications, including wiring harnesses, such as those used in automotive manufacturing.

The implementation or integration of FFCs into existing wiring environments is not without significant challenges. In an automotive application, by way of example only, an FFC-based wiring harness would be required to mate with perhaps hundreds of existing components, including sub-harnesses and various electronic devices (e.g., lights, sensors, etc.), each having established, and in some cases standardized, connector or interface types. Accordingly, a critical obstacle preventing the implementation of FFCs into these applications includes the need to develop quick, robust, and low resistance termination techniques which enable an FFC to be connectorized for mating with these existing connections.

Current FFC terminals include piercing-style crimp terminals, wherein sharpened tines of a terminal are used to pierce the insulation of the FFC in order to attempt to establish a secure electrical connection with the embedded conductor. In harsh environmental conditions, however, such a connection suffers from plastic creep and stress relaxation over time, failing to reliably maintain the electrical connection between the terminal and the conductor.

SUMMARY

A connector for a flat flexible cable includes a housing and a terminal disposed in the housing. The housing has a base and a cover. The base has a closed section with a receiving passageway and an open section extending from the closed section. The cover encloses the open section in a closed position of the cover. The cover has a main body with a pressing surface and a latch extending from the main body. The latch engages a catch of the base in the closed position. The terminal is disposed in the receiving passageway and has a tab extending into the open section. The pressing surface abuts the tab and presses the tab toward the base in the closed position.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
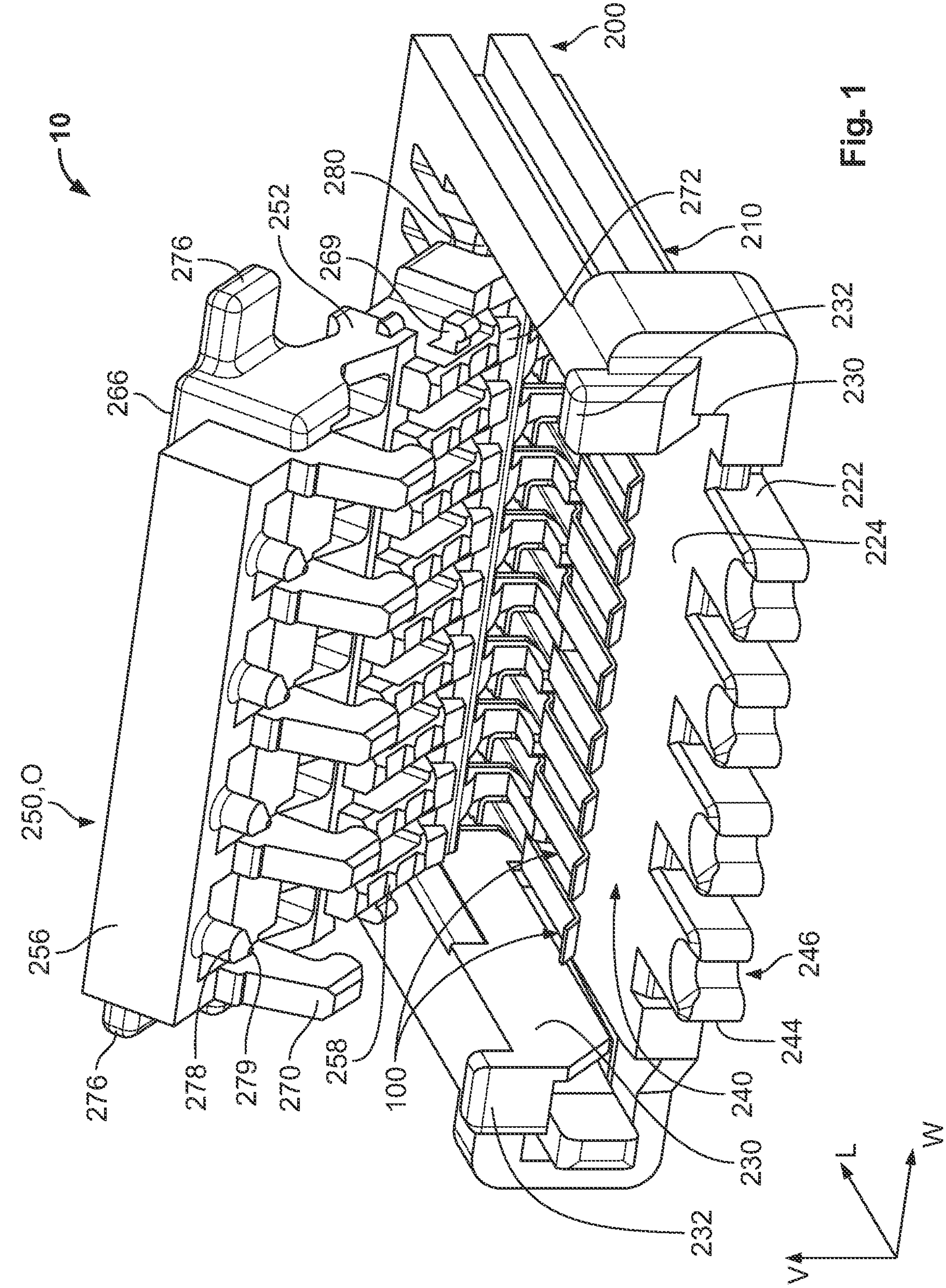
FIG. 1 is a perspective view of a connector according to an embodiment with a cover of a housing in an open position.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the specification, directional descriptors are used such as "longitudinal", "width", and "vertical". These descriptors are merely for clarity of the description and for differentiation of the various directions. These directional descriptors do not imply or require any particular orientation of the disclosed elements.

Throughout the drawings, only one of a plurality of identical elements may be labeled in a figure for clarity of the drawings, but the detailed description of the element herein applies equally to each of the identically appearing elements in the figure.

A connector 10 according to an embodiment is shown in FIG. 1. The connector 10 comprises a plurality of terminals 100 and a housing 200 in which the plurality of terminals 100 are disposed. As shown in FIGS. 3 and 6-9, the connector 10 can be connected to a flat flexible cable (FFC) 20 to form a connector assembly 1. One of the terminals 100 will be referenced and described in detail in the following description, but the description applies equally to each of the terminals 100 of the connector 10 and the connector assembly 1.

Figure 2:
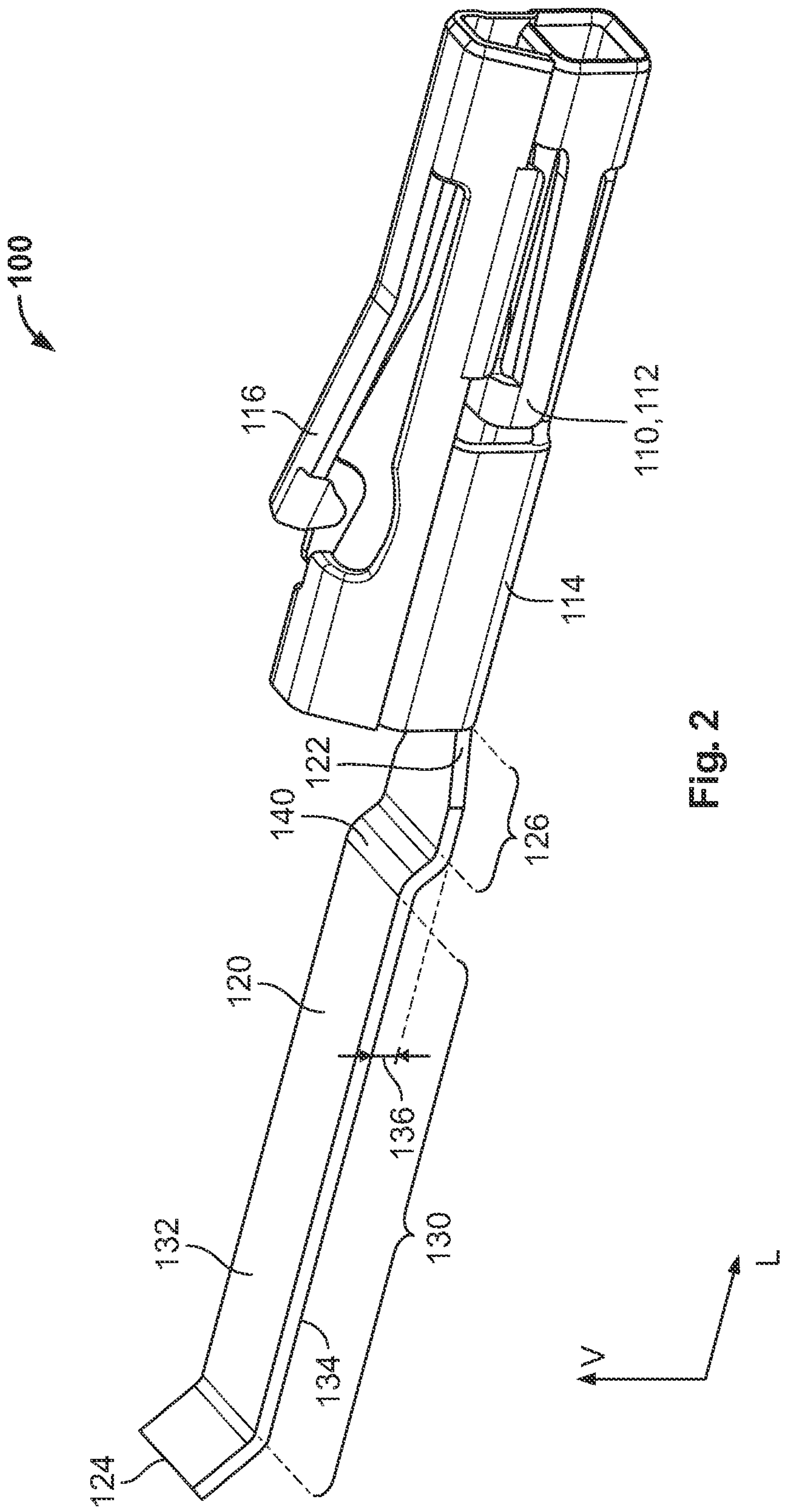
FIG. 2 is a perspective view of a terminal of the connector.

The terminal 100, as shown in FIG. 2, has a mating interface 110 and a tab 120 extending from the mating interface 110 in a direction opposite to a longitudinal direction L. The terminal 100 is formed of a conductive material. In an embodiment, the mating interface 110 and the tab 120 are monolithically formed in a single piece from a conductive material, such as a copper or an aluminum material.

The mating interface 110, as shown in FIG. 2, has a pin interface 112 with a bottom portion 114. The pin interface 112, in the embodiment shown in FIG. 2, is a box and spring interface adapted to resiliently abut and electrically connect to a contact pin. In other embodiments, the pin interface 112 may by any type of interface adapted to electrically connect to a contact pin. In the embodiment shown in FIG. 2, the mating interface 110 has a clip latch arm 116 protruding in a vertical direction V perpendicular to the longitudinal direction L and resiliently deflectable with respect to the mating interface 110.

The tab 120, as shown in FIG. 2, extends from a first end 122 to a second end 124 opposite to the longitudinal direction L. The first end 122 is connected to the bottom portion 114 of the mating interface 110. The tab 120 has an interface section 126 extending from the first end 122 toward the second end 124, a connection section 130 extending from the interface section 126 away from the mating interface 110 to the second end 124, and a jog bend 140 positioned between the interface section 126 and the connection section 130. As shown in FIG. 2, due to the jog bend 140, the connection section 130 is displaced from the interface section 126 along the vertical direction V by a jog gap 136. The connection section 130 has an upper surface 132 and a lower surface 134 opposite to the upper surface 132 in the vertical direction V.

Figure 3:
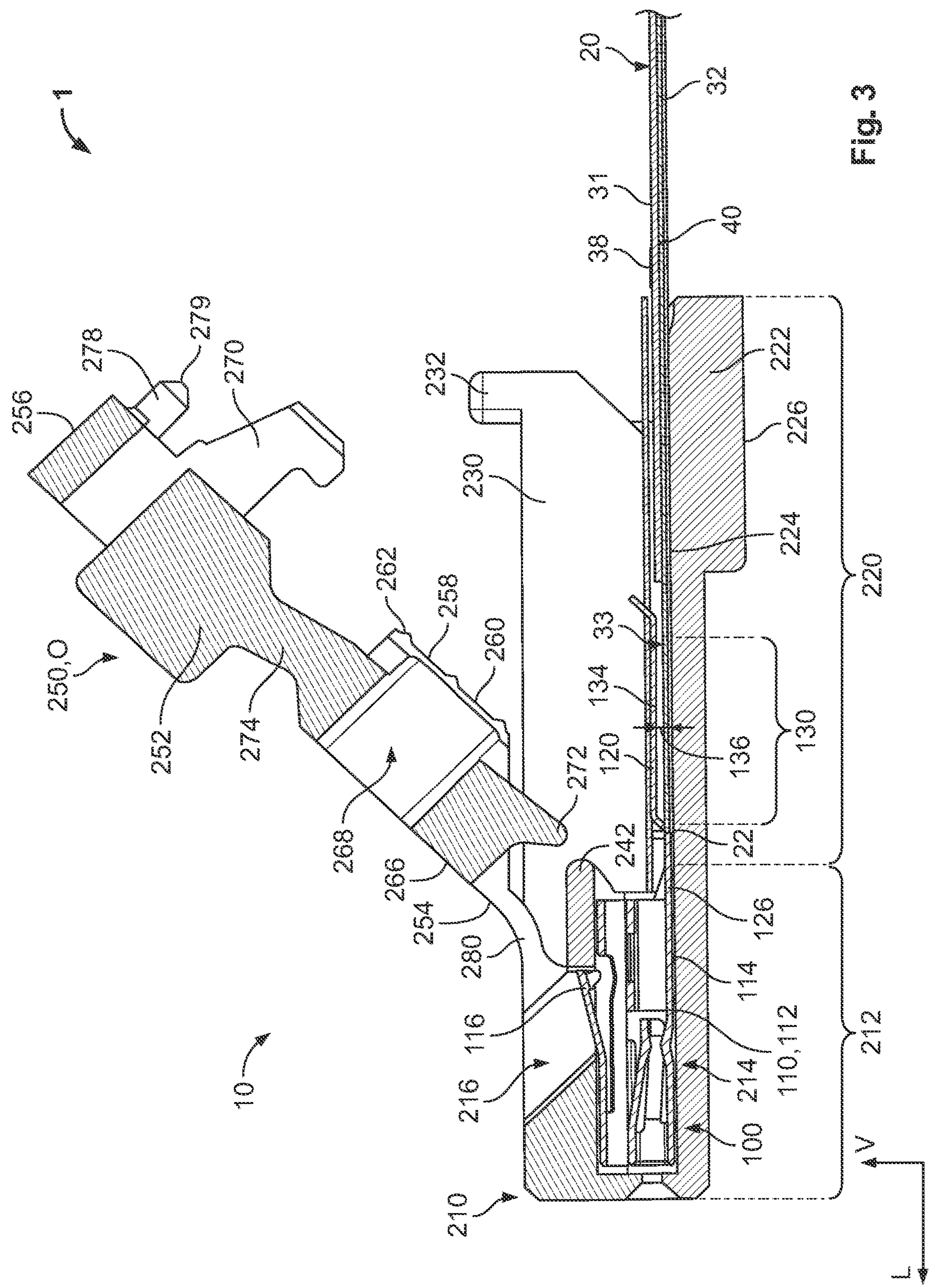
FIG. 3 is a sectional side view of a connector assembly according to an embodiment including the connector of FIG. 1 and a flat flexible cable.
Figure 6:
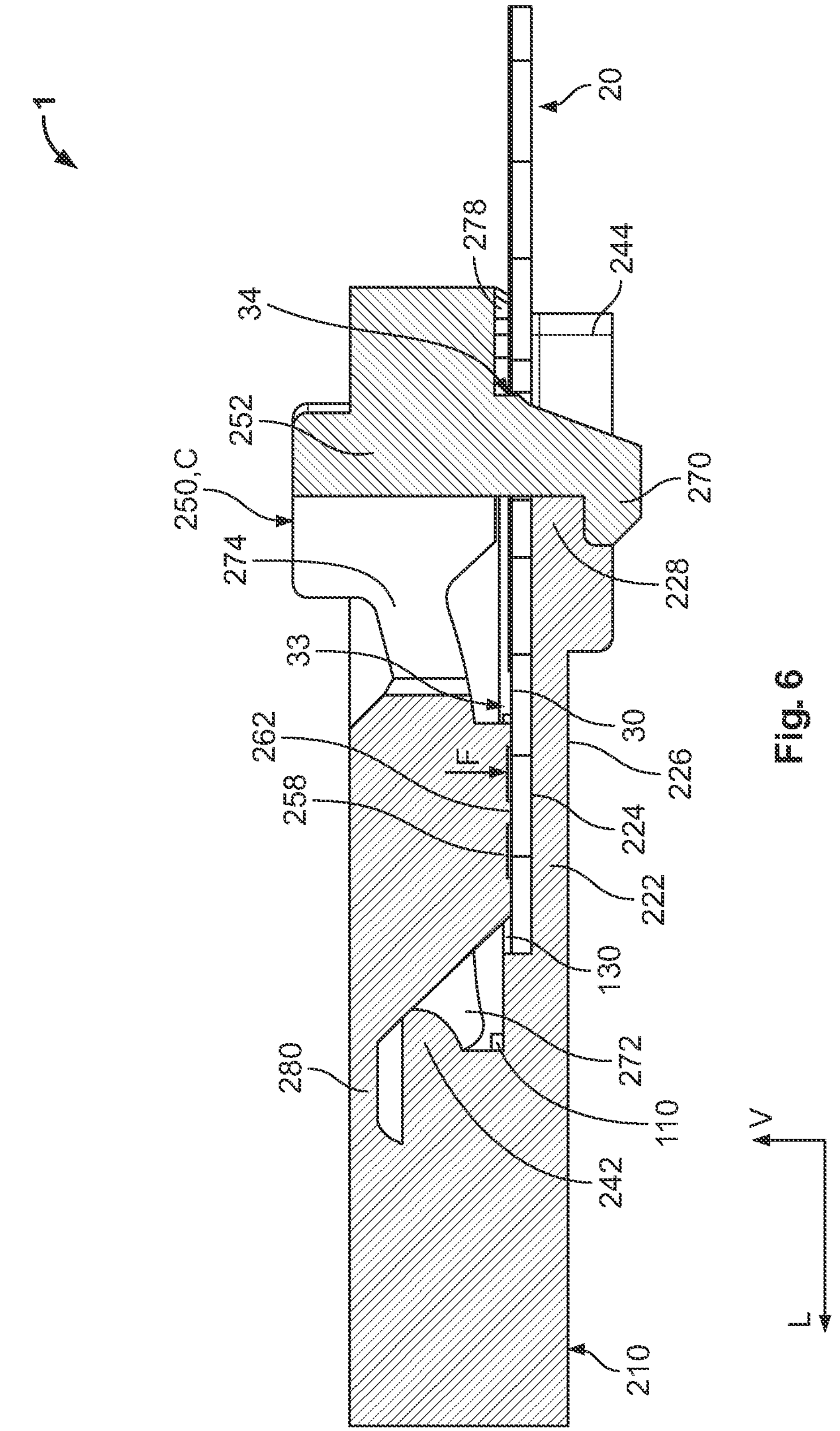
FIG. 6 is a sectional side view of the connector assembly with the cover of the housing in a closed position.
Figure 7:
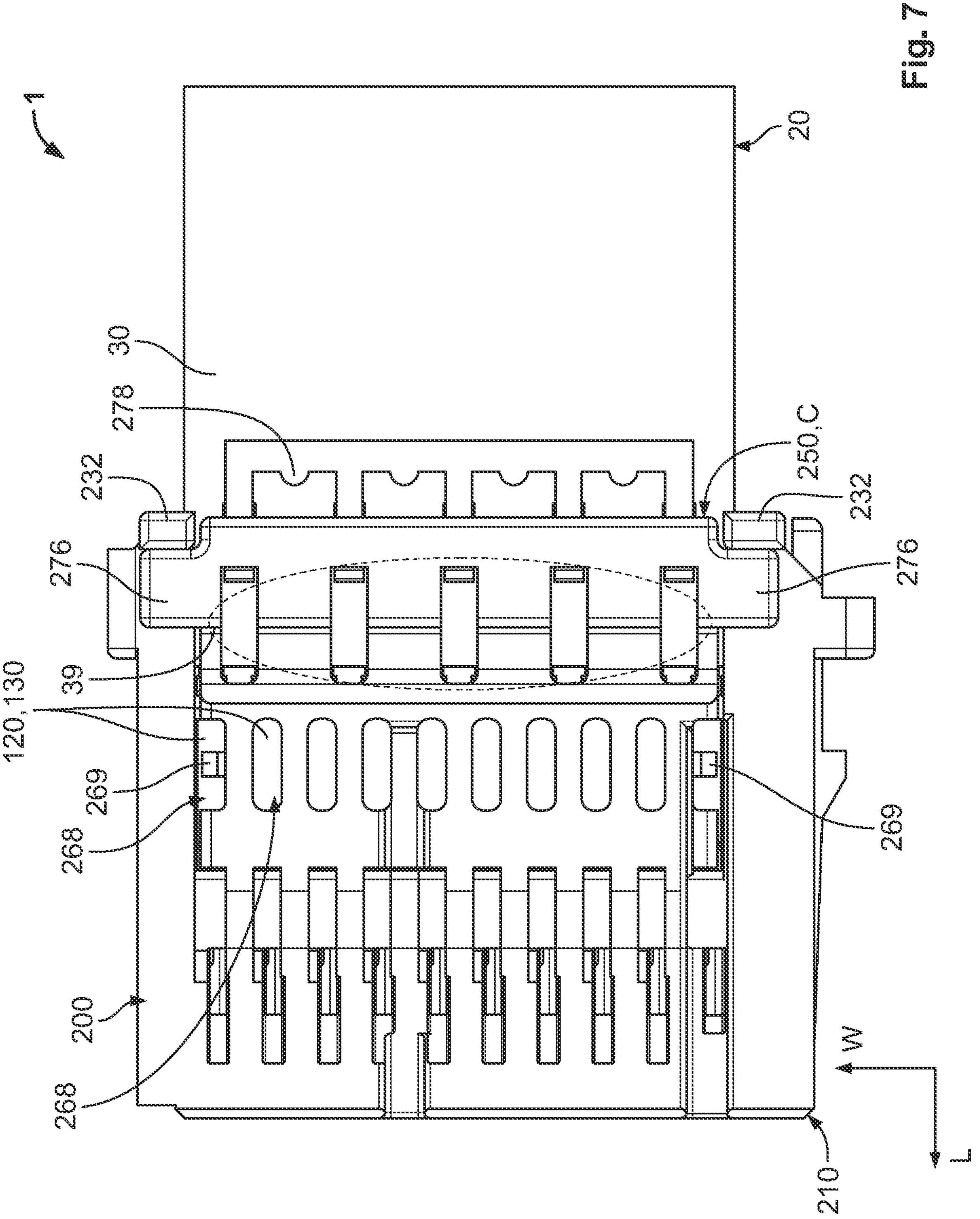
FIG. 7 is a plan view of the connector assembly with the cover in the closed position.
Figure 8:
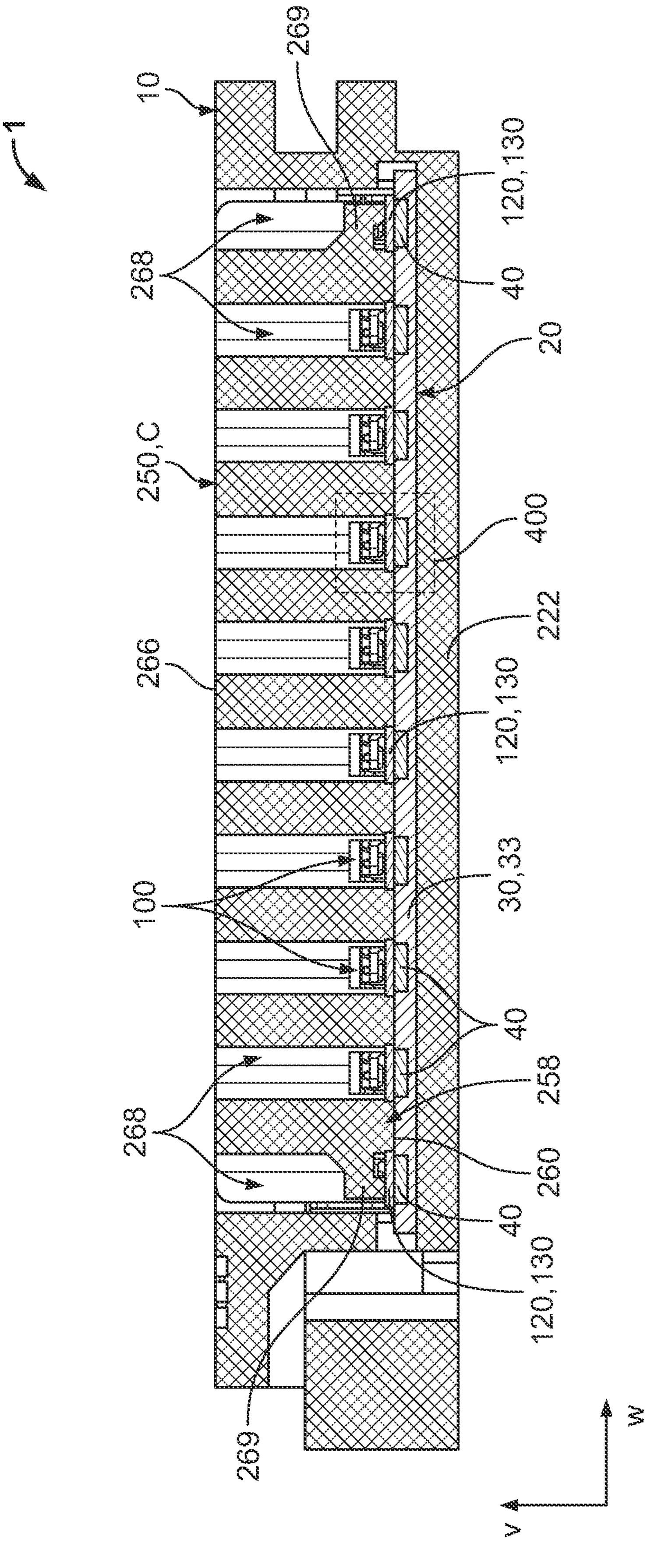
FIG. 8 is a sectional end view of the connector assembly with the cover in the closed position.

The housing 200, as shown in FIGS. 1, 3, and 6-8, has a base 210 and a cover 250 movable with respect to the base 210 between an open position O, shown in FIGS. 1 and 3, and a closed position C, shown in FIGS. 6-8.

In the embodiment shown in FIGS. 1, 3, 6, and 7, the base 210 is attached to the cover 250 by a hinge 280 and the cover 250 is rotatable about the hinge 280 between the open position O and the closed position C. In the shown embodiment, the base 210 and the cover 250 are monolithically formed in a single piece and the hinge 280 is a film hinge. In other embodiments, the base 210 and the cover 250 can be formed in separate pieces and can be attached at the hinge 280 and rotatable about the hinge 280, or the base 210 and the cover 250 can be entirely separate pieces without the hinge 280. The housing 200 is formed of an insulative material, such as a plastic.

The base 210, as shown in FIG. 3, has a closed section 212 and an open section 220 extending from the closed section 212 along the longitudinal direction L. The closed section 212 encloses a receiving passageway 214 extending through the closed section 212 along the longitudinal direction L. A spring latch passageway 216 extends through the closed section 212 in the vertical direction V and communicates with the receiving passageway 214.

The open section 220, as shown in FIGS. 1 and 3, has a bottom wall 222 and a pair of sidewalls 230 extending from the bottom wall 222 in the vertical direction V. The bottom wall 222 and the sidewalls 230 define an interior receiving space 240 in the open section 220. The bottom wall 222 has an interior surface 224 and an exterior surface 226 opposite the interior surface 224 in the vertical direction V. As shown in FIG. 6, the bottom wall 222 has a catch 228 at an end of the bottom wall 222 in the longitudinal direction L. The catch 228 protrudes from the bottom wall 222 in the longitudinal direction L and in the vertical direction V.

As shown in FIGS. 1 and 3, each of the sidewalls 230 has a positioning tab 232 positioned at an end of the sidewall 230 in the longitudinal direction L and extending from the sidewall 230 in the vertical direction V.

The base 210, as shown in FIG. 3, has a base wedge 242 extending from the closed section 212 along the longitudinal direction L. In the shown embodiment, the base wedge 242 has an approximately triangular shape sloping toward the receiving passageway 214.

As shown in FIG. 1, the base 210 has a plurality of retention arms 244 extending along the longitudinal direction L. The retention arms 244 extend from an end of the open section 220 opposite the closed section 212. Each of the retention arms 244 has a retention recess 246 at an end of the retention arm 244.

The cover 250, as shown in FIGS. 1 and 3, has a main body 252 with a first end 254 and an opposite second end 256. The first end 254 of the main body 252 is attached to the hinge 280 in the shown embodiment. The main body 252 has a pressing surface 258 and an exterior surface 266 opposite the pressing surface 258.

Figure 4:
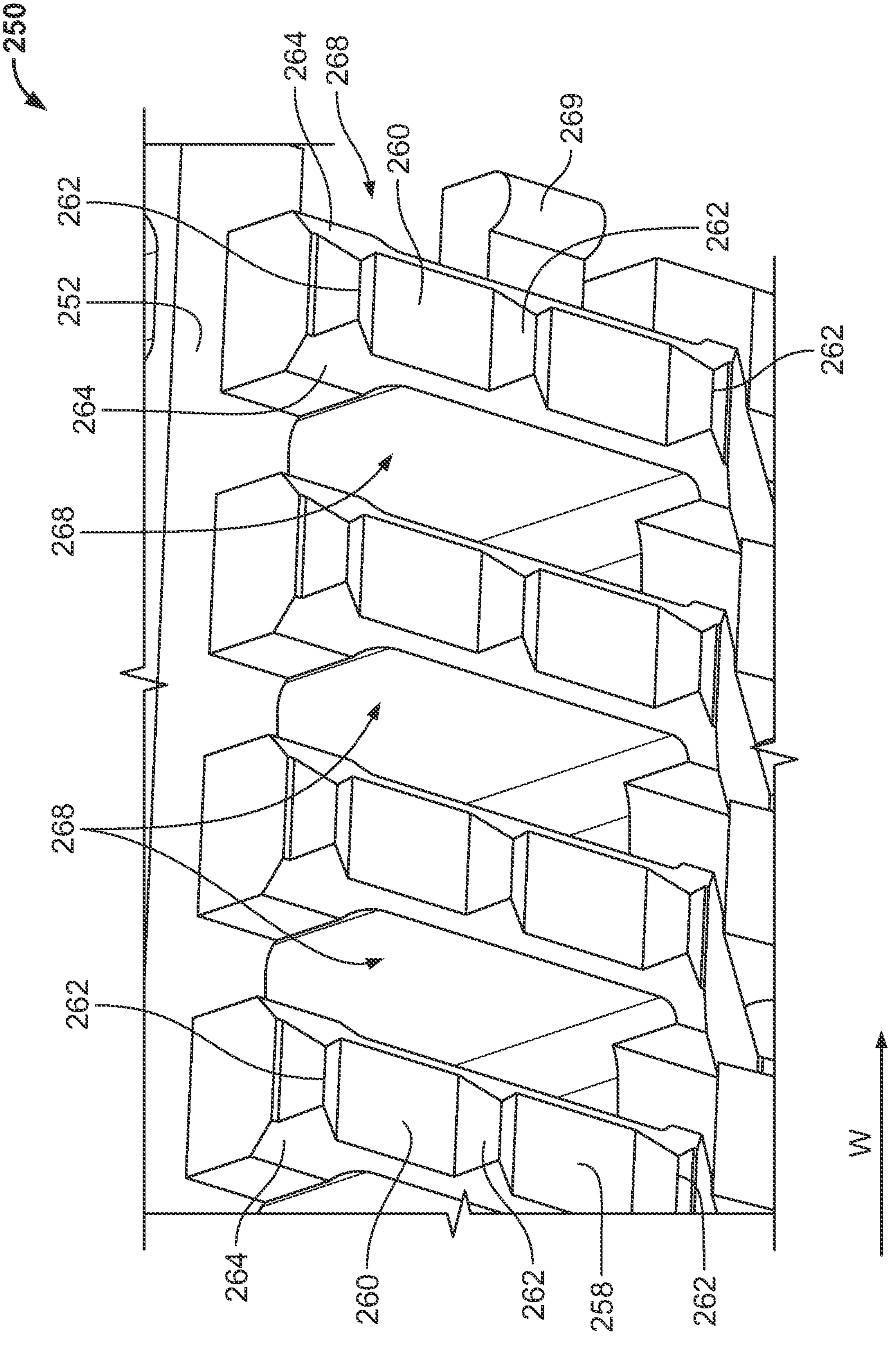
FIG. 4 is a detail perspective view of a pressing surface of the housing.

The pressing surface 258, as shown in FIG. 4, is formed by a plurality of separating surfaces 260 that, as shown in FIG. 3, are parallel to the exterior surface 266. The pressing surface 258 includes a plurality of bearing surfaces 264 each sloped and extending at an angle from one of the separating surfaces 258. In the shown embodiment, each of the separating surfaces 260 has a plurality of ribs 262 disposed on and projecting from the separating surface 260. Each of the separating surface 260 has three ribs 262 in the shown embodiment; in other embodiments, the separating surfaces 260 could each have one rib 262, two ribs 262, or more than three ribs 262, or the ribs 262 could be omitted from the separating surfaces 260.

As shown in FIGS. 3 and 4, the cover 250 has a plurality of windows 268 extending through the cover 250 from the pressing surface 258 to the exterior surface 266. The windows 268 alternate with the separating surfaces 260 along a width direction W perpendicular to the longitudinal direction L and the vertical direction V. The bearing surfaces 264 on each of the separating surfaces 260 extend at an angle from the separating surface 260 to the adjacent windows 268, tapering toward the separating surface 260 as shown in FIG. 4.

As shown in FIGS. 4 and 8, in each of the outermost windows 268 of the plurality of windows 268 in the width direction W, the cover 250 has a pressing arm 269 extending from the main body 252 into the window 268. The pressing arm 269, in the shown embodiment, is an L-shaped member. In other embodiments, the pressing arm 269 could have different shapes than the L-shaped member of the shown embodiment, provided that the pressing arm 269 protrudes into the window 268 and can perform the functions of the pressing arm 269 described below.

The cover 250, as shown in FIGS. 1 and 3, has a plurality of latches 270 extending from the main body 252 at the second end 256 of the main body 252. The embodiment shown in FIG. 1 has five latches 270 distributed along the main body 252 in the width direction W. In other embodiments, the number of latches 270 can be any other number of latches 270, including one latch 270.

The cover 250, as shown in FIGS. 1 and 3, has a plurality of cover wedges 272 positioned at the first end 254 of the main body 252. The cover wedges 272 extend from the main body 252 in the longitudinal direction L and the vertical direction V and, in the shown embodiment, have an approximately triangular shape. The number of cover wedges 272 could differ from the number in the embodiment shown in FIG. 1, provided that the number of cover wedges 272 corresponds to the number of base wedges 242.

The main body 252 of the cover 250, as shown in FIG. 3, has a latch beam 274 disposed between the latches 270 and the windows 268. The latch beam 274 is monolithically formed in a single piece with the cover 250 but is resiliently flexible, allowing some deflection of the latch 270 with respect to the first end 254 of the main body 252.

The cover 250, as shown in FIG. 1, has a pair of flanges 276 extending from the second end 256 of the main body 252 in the width direction W, and has a plurality of retention pegs 278 extending from the second end 256 of the main body 252. Each of the retention pegs 278, in the shown embodiment, is an approximately cylindrical member with a pointed end 279 opposite the main body 252. The number of retention pegs 278 could differ from the number in the shown embodiment, provided that the number of retention pegs 278 corresponds to the number of retention recesses 246. In other embodiments, an exterior shape of the retention pegs 278 could differ from the cylindrical shape of the shown embodiment, provided that the shape of the retention pegs 278 corresponds to the shape of the retention recesses 246.

Figure 5:
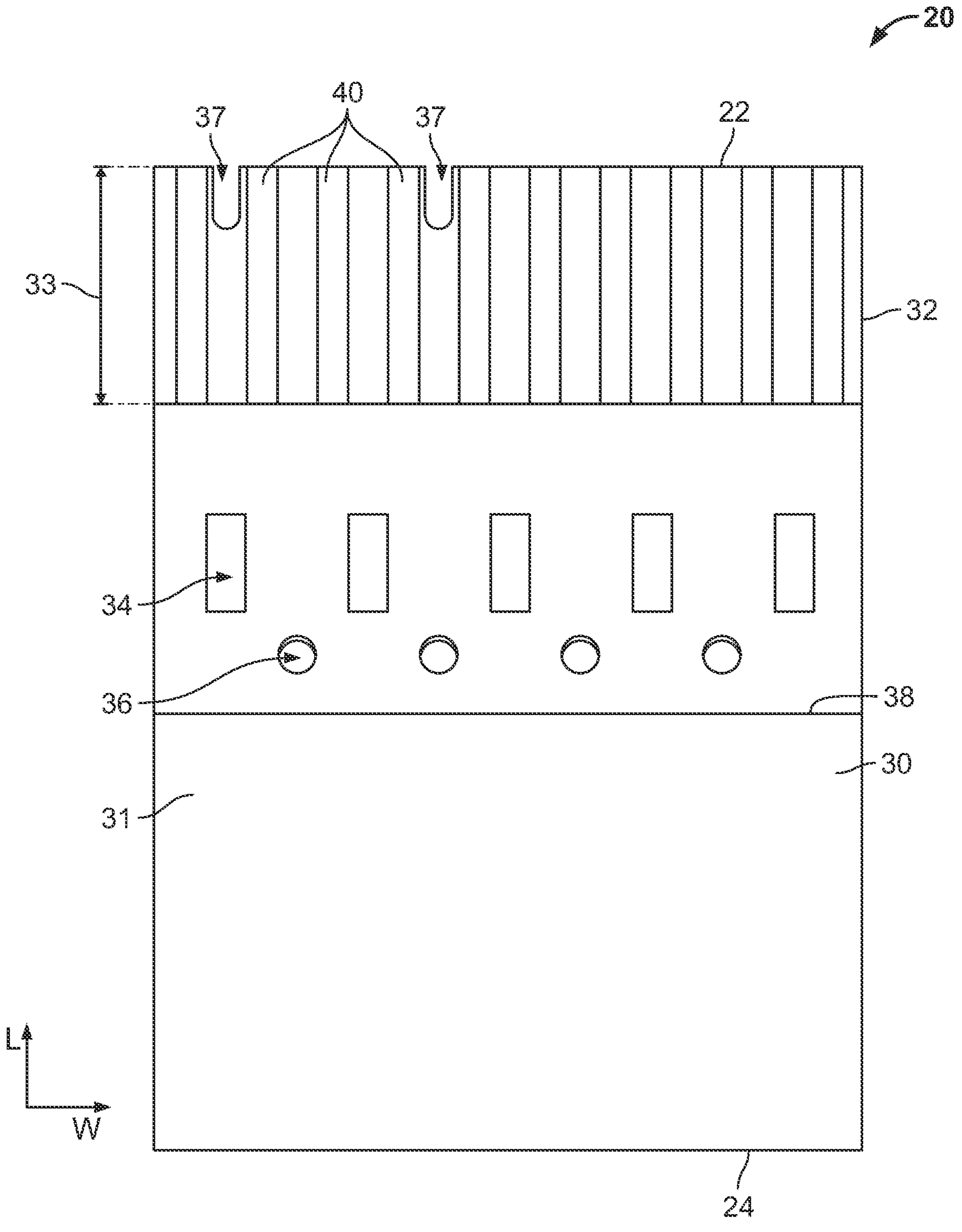
FIG. 5 is a plan view of the flat flexible cable.

The FFC 20 that is connected to the connector 10 to form the connector assembly 1 is shown in FIG. 5. The FFC 20 extends from a first end 22 to a second end 24 along the longitudinal direction L. The FFC 20 includes an insulation material 30 and a plurality of flat conductors 40 embedded in the insulation material 30. In an embodiment, the flat conductors 40 are each a metallic foil, such as a copper foil, by way of example only, patterned in any desirable configuration. In another embodiment, the flat conductors 40 could each be formed of an aluminum material. The insulation material 30, such as a polymer insulation material, may be applied to either or both sides of the flat conductors 40 via an adhesive material or extruded directly over the flat conductors 40. The flat conductors 40 may also be referred to as conductors 40 herein.

The insulation material 30 has an upper side 31 and a lower side 32 opposite the upper side 31 in the vertical direction V, as shown in FIGS. 3 and 5. The conductors 40 are embedded in the insulation material 30 between the upper side 31 and the lower side 32. The FFC 20, in the embodiment shown in FIG. 5, has a stripped section 33 at the first end 22 in which the upper side 31 of the insulation material 30 is removed to expose a side of the conductors 40.

As shown in the embodiment of FIG. 5, the FFC 20 has a plurality of latch openings 34 and a plurality of a plurality of peg openings 36 extending through the insulation material 30. The latch openings 34 and the peg openings 36 are positioned between the conductors 40 and do not expose the conductors 40. In the shown embodiment, the FFC 20 has five first latch openings 34 and four peg openings 36. In other embodiments, the FFC 20 could have any number of latch openings 34 and peg openings 36, provided that the number of latch openings 34 corresponds to the number of latches 270 and the number of peg openings 36 corresponds to the number of retention pegs 278.

In the embodiment shown in FIG. 5, the FFC 20 has a pair of key slots 37 extending into the first end 22 of the FFC 20 in the stripped section 33. The positioning and number of the key slots 37 in the shown embodiment are merely exemplary, and any number of key slots 37 can be positioned in any arrangement at the first end 22 of the FFC 20 in other embodiments.

The FFC 20, as shown in FIG. 5, has an insertion indicator 38 on the upper side 31. The insertion indicator 38, in the shown embodiment, is a line extending across the upper side 31 of the insulation material 30 in the width direction W. The insertion indicator 38 is visible by a user and distinguishable on the insulation material 30, such as by having a different color than the insulation material 30. In the shown embodiment, the insertion indicator 38 extends across an entirety of the insulation material 30 in the width direction W. In other embodiments, the insertion indicator 38 can extend across only a portion of the insulation material 30 in the width direction W. The position of the insertion indicator 38 on the insulation material 30 along the longitudinal direction L in merely exemplary in the embodiment show in FIG. 5; the precise positioning of the insertion indicator 38 along the longitudinal direction L will depend upon the function of the insertion indicator 38 described in detail below.

The assembly of the connector assembly 1 will now be described in greater detail primarily with reference to FIGS. 1, 3, and 6-9.

The terminals 100 are inserted into the housing 200 with the cover 250 in the open position O, as shown in FIG. 1. The terminals 100 are each inserted into one of the receiving passageways 214 shown in FIG. 3 along the longitudinal direction L. The insertion of the terminals 100 into the housing 200 forms the connector 10. The connector 10 can be transported with the terminals 100 preloaded in the housing 200 to protect the terminals 100 during shipping and handling.

In an embodiment of the terminal 100 with the clip latch arm 116, as shown in FIG. 2, the clip latch arm 116 contacts the housing 200 during insertion along the longitudinal direction L. The clip latch arm 116 is deflected by the housing 200 until the clip latch arm 116 resiliently deflects away from the mating interface 110 and into the spring latch passageway 216. The clip latch arm 116 engages the housing 200 in the spring latch passageway 216 to secure the terminal 100 in the receiving passageway 214.

As shown in FIG. 3, the terminals 100 are each positioned in the receiving passageway 214 with the tab 120 extending into the open section 220. The interface section 126 of the tab 120 is positioned along the interior surface 224 of the bottom wall 222 and the connection section 130 is separated by the jog gap 136 from the interior surface 224 of the bottom wall 222 in the vertical direction V.

The FFC 20 is inserted into the interior receiving space 240 of the housing 200 with the cover 250 in the open position O and the terminals 100 in the receiving passageways 214, as shown in FIG. 3. In the embodiment shown in FIG. 3, the first end 22 of the FFC 20 with the stripped section 33 is inserted under the connection section 130 of the tab 120; the first end 22 is inserted into the jog gap 136 and the stripped section 33 is disposed in the jog gap 136. The stripped section 33 is disposed between the connection section 130 and the bottom wall 222 in the vertical direction V. The conductors 40 exposed in the stripped section 33 face the lower surface 134 of the connection section 130.

In another embodiment, the terminal 100 can be formed without the jog bend 140 and the connection section 130 can extend straight from the interface section 126 along the bottom wall 122. In this embodiment, the stripped section 33 can be positioned over the connection section 130 in the vertical direction V, with the conductors 40 exposed on a lower side 32 of the FFC 20 facing the upper surface 132 of the connection section 130.

In an embodiment, the first end 22 of the FFC 20 is inserted between the cover 250 and the base 210 until the insertion indicator 38 is approximately aligned with an end of the bottom wall 222 along the longitudinal direction L, as shown in FIG. 3. This position of the insertion indicator 38 indicates that the FFC 20 has been fully inserted into the connector 10. In other embodiments, with differently shaped housings 200 or different desired positions of the FFC 20 along the longitudinal direction L, the insertion indicator 38 could be positioned elsewhere on the insulation material 30 along the longitudinal direction L to indicate full insertion of the FFC 20. The key slots 37 ensure that the FFC 20 has been inserted into the connector 10 in the proper orientation.

The cover 250 is then moved from the open position O shown in FIG. 3 to the closed position C shown in FIG. 6. The cover 250 exposes the open section 220 in the open position O and encloses the open section 220 in the closed position C. In the shown embodiment, the cover 250 pivots about the hinge 280 from the open position O to the closed position C.

As the cover 250 begins to move toward the closed position C, from the position shown in FIG. 3 to the position shown in FIG. 6, the cover wedge 272 abuts the base wedge 242 and moves along the base wedge 242 as the cover 250 pivots about the hinge 280. In the closed position C, the cover wedge 272 can abut the mating interface 110 and ensure the terminal 100 is seated in the receiving passageway 214, securing the terminal 100 in the receiving passageway 214. Each of the latches 270 enters and moves through one of the latch openings 34 of the FFC 20 as the cover 250 moves toward the closed position C, helping to retain the FFC 20 in the connector 10.

Figure 11:
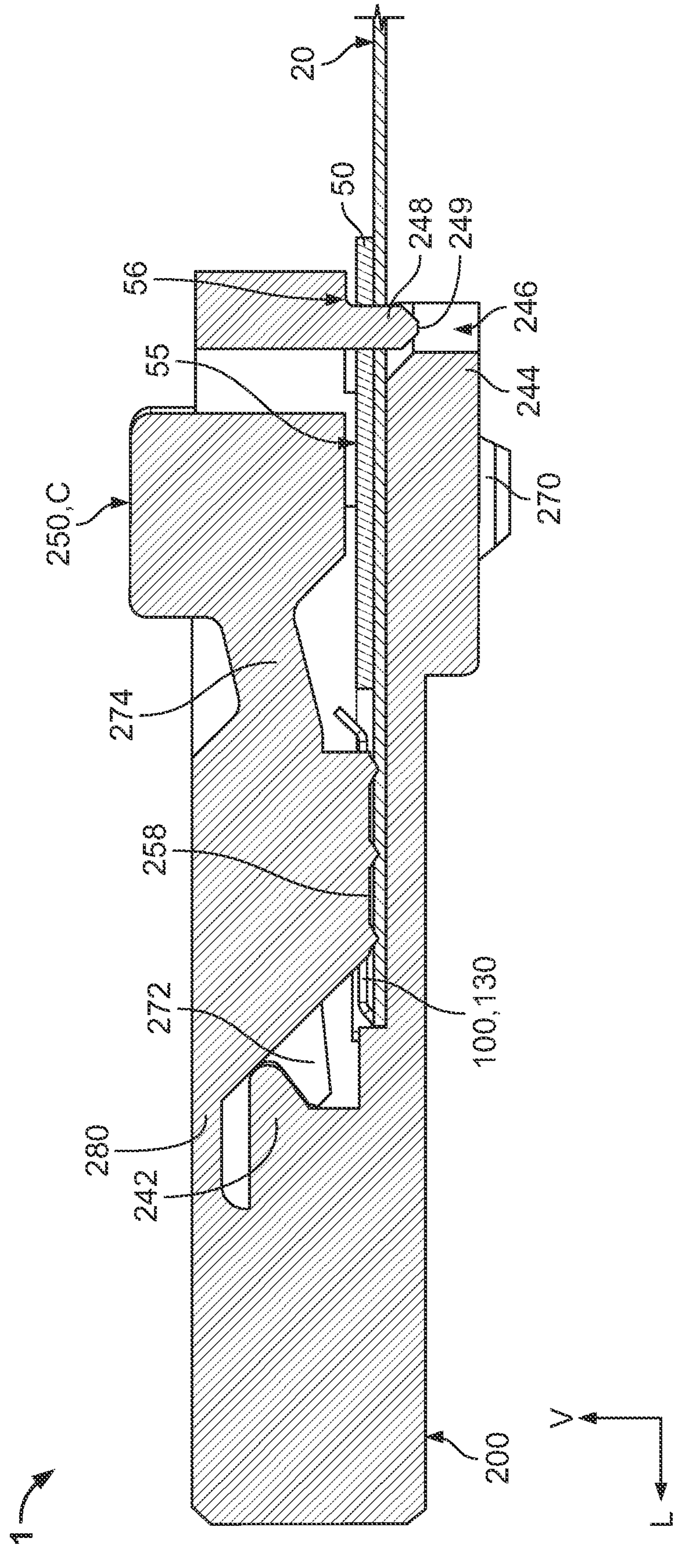
FIG. 11 is a sectional side view of a connector assembly with the flat flexible cable having the retention plate.

The retention pegs 278 each move through one of the peg openings 36 of the FFC 20 and are positioned in the retention recess 246 of one of the retention arms 244 in the closed position C, as shown in FIG. 6 and in another embodiment in FIG. 11. In another embodiment, the FFC 20 does not have the peg openings 36, and the pointed ends 279 of the retention pegs 278 pierce the insulation material 30 between the conductors 40 as the cover 250 moves into the closed position C. The retention pegs 278 retain the FFC 20 while the positioning of the pegs 278 in the retention recesses 246 allows for a visual confirmation that the cover 250 has reached the closed position C.

Additionally, in the closed position C, the flanges 276 each abut one of the positioning tabs 232 along the longitudinal direction L, as shown in FIG. 7. The abutment of the flanges 276 with the positioning tabs 232 further limits the movement of the cover 250 out of the closed position C along the longitudinal direction L. The restrictions on the movement of the cover 250 from the closed position C described herein help to retain the terminals 100 in electrical contact with the conductors 40 of the FFC 20 as described below.

As the cover 250 moves from the open position O shown in FIG. 3 to the closed position C shown in FIG. 6, the pressing surface 258 moves into contact with the terminals 100 and the FFC 20. The ribs 262 of the separating surfaces 260 abut and press on the insulation material 30 of the FFC 20 between the conductors 40 and the bearing surfaces 264 abut the upper surfaces 132 of the connection sections 130 of the terminals 100, as described in greater detail below with respect to FIGS. 8 and 9. In an embodiment, the pressing surface 258 contacts the terminals 100 and the FFC 20 before the latch 270 is fully engaged with the catch 228 due to the resilient flexure of the latch beam 274. As the cover 250 moves into the closed position C shown in FIG. 6, the latch 270, under an elastic restoration of the latch beam 274, engages the catch 228 to secure the cover 250 with respect to the base 210. In the closed position C shown in FIG. 6, the pressing surface 258 abuts the insulation material 30 of the FFC 20 and provides a pressing force F pressing the connection section 130 of the tab 120 toward the bottom wall 222 of the base 210. In an embodiment, the resilient flexure of the latch beam 274 increases the pressing force F.

Figure 9:
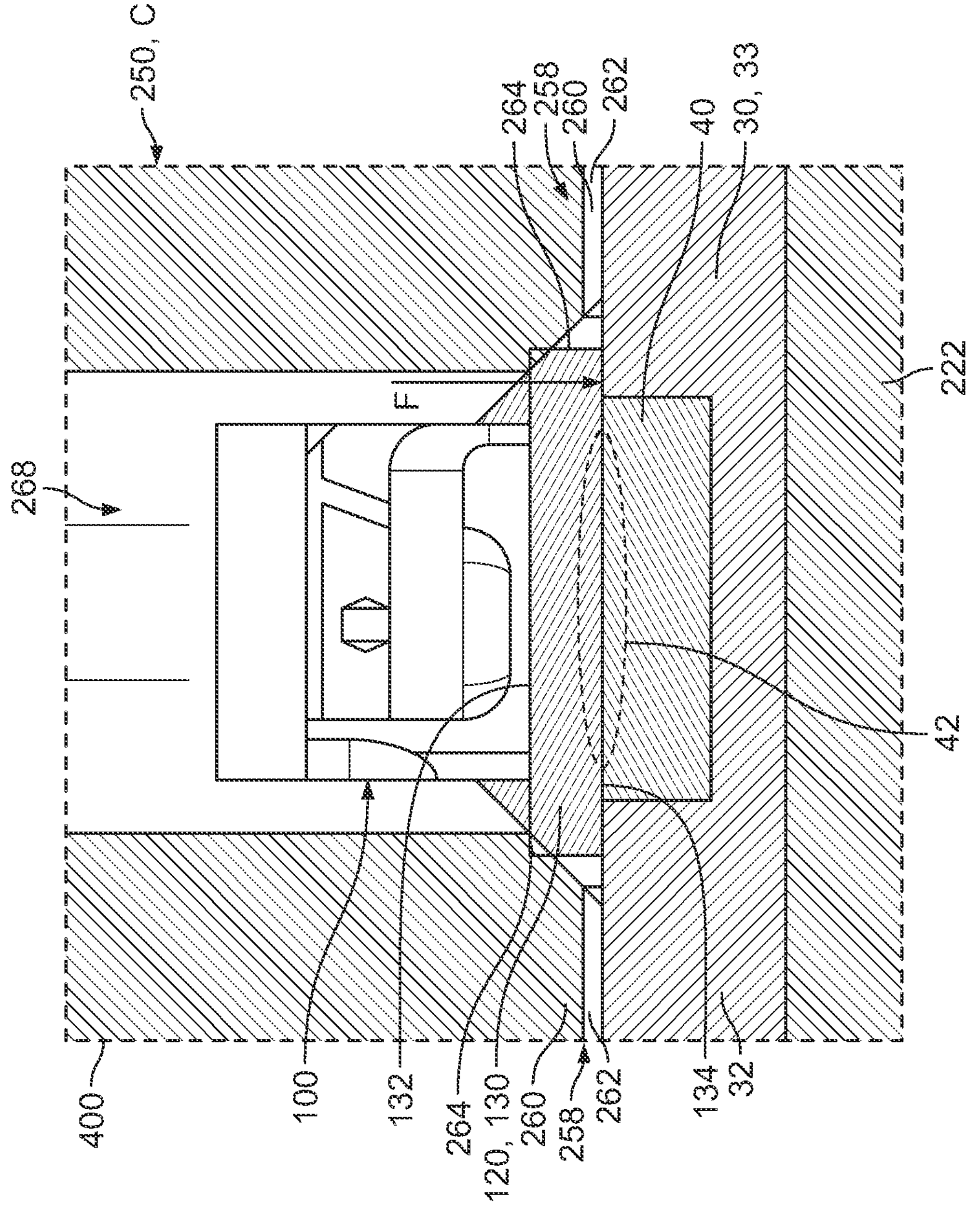
FIG. 9 is a detail sectional end view of a portion of FIG. 8.

As shown in FIG. 8 and the detail view in FIG. 9 of a portion 400 of FIG. 8, in the closed position C, the ribs 262 of the separating surfaces 260 abut and press the insulation material 30 between the conductors 40 against the bottom wall 222 of the base 210. The separating surfaces 260 separate the tabs 120 of the terminals 100 from one another. The lower surface 134 of the connection section 130 of each of the tabs 120, as shown in FIGS. 8 and 9, abuts and is electrically connected with one of the conductors 40. The connection section 130 of each of the tabs 120 is pressed toward the bottom wall 222 of the base 210 and against the conductor 40 under the pressing force F by the bearing surfaces 264, which bear on the upper surface 132 of the connection section 130. In each of the outermost windows 268 in the width direction W, as shown in FIG. 8, the pressing arm 269 presses the tab 120 and the conductor 40 aligned with the outermost window 168 together in the closed position C.

The engagement of the latch 270 with the catch 228 in the closed position C retains the terminals 100 in the position shown in FIGS. 8 and 9, with the connection sections 130 electrically connected to the conductors 40 and the pressing force F increasing a contact between the conductors 40 and the connection sections 130 of the tabs 120. The retention in the closed position C and the pressing force F described herein create an electrical connection between the terminals 100 and the conductors 40 of the FFC 20 that is robust and resilient over time, avoiding the need to crimp the terminals 100 to the FFC 20.

As shown in FIGS. 7 and 8, in the closed position C, each of the windows 268 is aligned in the vertical direction V with the connection section 130 of the tab 120 of one of the terminals 100. The windows 268 each expose the upper surface 132 of one of the connection sections 130 to an area outside of the connector 10 and outside of the connector assembly 1.

In an embodiment, the connection sections 130 are each welded to one of the conductors 40 through a corresponding one of the windows 268, for example by laser welding. The welding forms a conductive weld joint 42 between the connection section 130 and the conductor 40 through the window 268, as shown in FIG. 9. The conductive weld joint 42 maintains the electrical connection between the connection section 130 and the conductor 40 while further mechanically securing the connection of the terminals 100 and the FFC 20.

As shown in FIG. 7, the windows 268 and the tabs 120 provide a long, flat area for welding the connection sections 130 to the conductors 40 along the longitudinal direction L. The separating surfaces 260 isolate the tabs 120 in the windows 268 from one another, as shown in FIGS. 8 and 9, containing any splatter that may occur during welding to one window 268, isolating one circuit from another by avoiding forming unintended electrical connections between adjacent tabs 120 and conductors 40. The pressing force F pressing the connection sections 130 against the conductors 40 eliminates weld gaps, further increasing long term stability of the connection between the terminals 100 and the FFC 20.

In the shown embodiment, the conductors 40 are each disposed on a side of one of the tabs 120 opposite one of the windows 268 in the vertical direction V. The welding in this embodiment is performed from the connection section 130 to the conductor 40; welding is performed from a thicker material to a thinner material, or from a material with a higher melting point to a material with a lower melting point. In other embodiments, the conductor 40 can be arranged over the connection section 130 if the connection section 130 does not have the jog bend 140 as described above, and the welding in this embodiment can be performed from the conductor 40 to the connection section 130. Alternatively, in the embodiment in which the conductor 40 is arranged over the connection section 130, the window 268 can extend through the bottom wall 222 and the welding can be performed from the connection section 130 to the conductor 40.

In another embodiment, the welding is not performed through the windows 268 and no conductive weld joint 42 is formed between the connection sections 130 and the conductors 40. In this embodiment, the pressing force F is sufficient to maintain both the electrical connection between the tabs 120 and the conductors 40 and the mechanical connection between the terminals 100 and the FFC 20.

In an embodiment, in the closed position C of the cover 250 shown for example in FIG. 7, a plastic welding is performed to connect the insulation material 30 of the FFC 20 to the housing 200 by a plastic weld joint 39, further mechanically connecting the FFC 20 to the housing 200. In an embodiment, the plastic weld joint 39 can be formed between the insulation material 30 and the housing 200 in the region indicated in FIG. 7; for example through openings in the housing 200 adjacent to the windows 268 along the longitudinal direction L. In other embodiments, the plastic weld joint 39 could be formed at any area of the connector assembly 1 at which the insulation material 30 abuts the housing 200.

Figure 10:
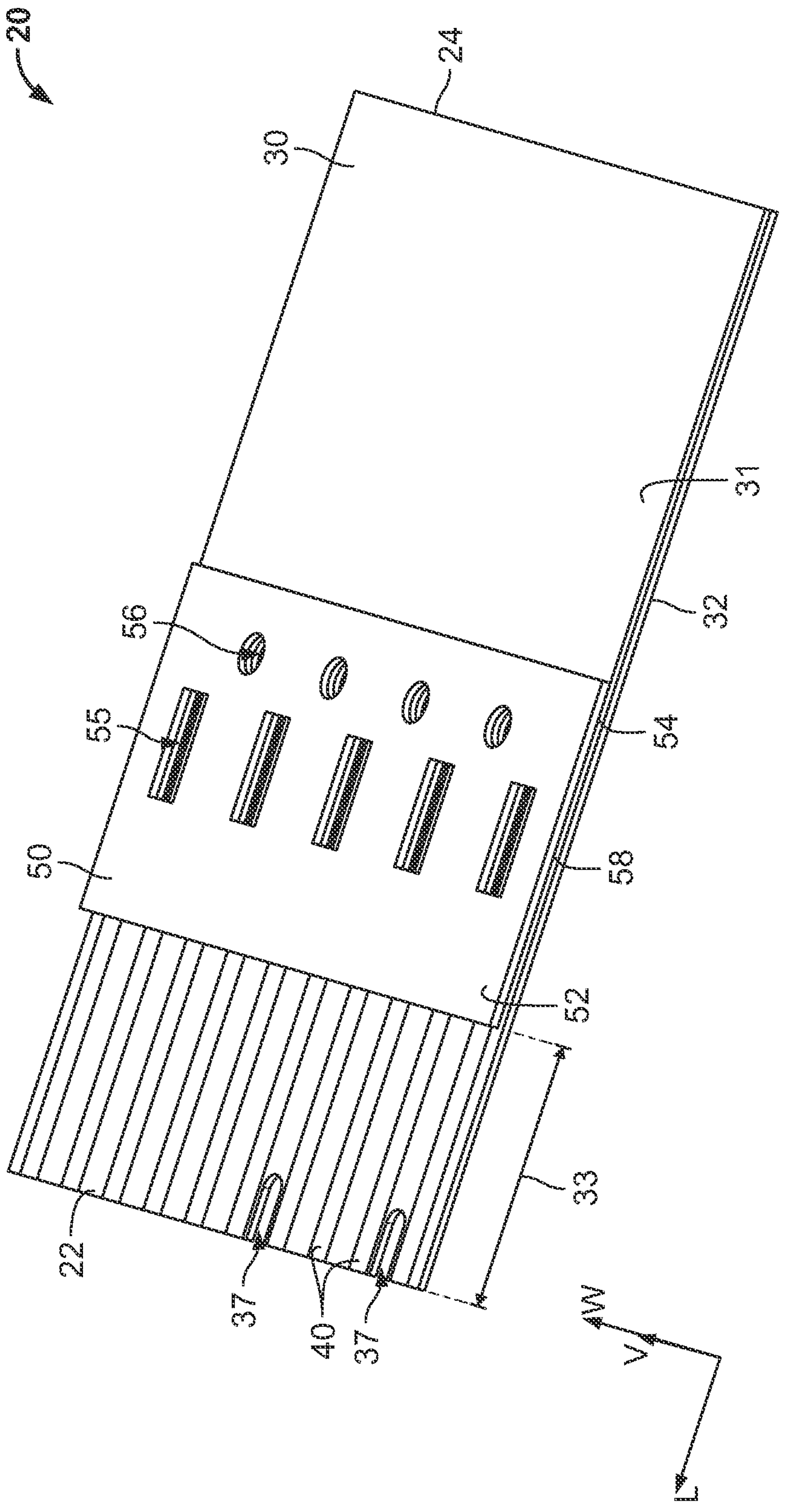
FIG. 10 is a perspective view of a flat flexible cable with a retention plate according to an embodiment.

An FFC 20 used in a connector assembly 1 according to another embodiment is shown in FIGS. 10 and 11. Like reference numbers indicate like elements, and primarily the differences from the embodiments of the FFC 20 and the connector assembly 1 described with reference to FIGS. 1-9 will be described in detail.

As shown in the embodiment of FIG. 10, the FFC 20 has a retention plate 50 attached to the upper side 31 of the insulation material 30. The retention plate 50 has a first surface 52 and a second surface 54 opposite to the first surface 52 along the vertical direction V. The retention plate 50 has a plurality of latch openings 55 and a plurality of retention openings 56 extending through the retention plate 50 in the vertical direction V from the first surface 52 to the second surface 54. The number of latch openings 55 in the retention plate 50 corresponds to the number of latch openings 34 in the FFC 20, and the number of retention openings 56 in the retention plate 50 corresponds to the number of peg openings 36 in the FFC 20. The retention plate 50 is a resiliently flexible member that is monolithically formed in a single piece from an insulative plastic material, such as mylar.

As shown in FIG. 10, the second surface 54 of the retention plate 50 is disposed on the upper side 31 of the FFC 20. The latch openings 55 are aligned with the latch openings 34 along the vertical direction V, and the retention openings 56 are aligned with the peg openings 36 along the vertical direction V. The openings 55, 56, in the retention plate 50 may be the same size or larger than the corresponding openings 34, 36 in the FFC 20. In another embodiment, one retention plate 50 can be disposed on each of the upper side 31 and the lower side 32 of the FFC 20 and aligned as described herein.

In an embodiment, the retention plate 50 is attached to the upper side 31 of the FFC 20 by an adhesive 58, as shown in FIG. 10. The adhesive 58 may be a same type of adhesive as is used to attach the upper side 31 and the lower side 32 of the insulation material 30 to each other around the conductors 40 of the FFC 20. In another embodiment, the adhesive 58 is not used, and the retention plate 50 is disposed on the upper side 31 and/or the lower side 32 and retained by the elements of the housing 200 as described below.

The FFC 20 with the retention plate 50 is used in the connector assembly 1 as shown in FIG. 11. The FFC 20 with the retention plate 50 attached or disposed on at least one of the upper side 31 and the lower side 32 is inserted into the connector 10 with the cover 250 in the open position O as described in detail above. When the cover 250 is moved from the open position O to the closed position C shown in FIG. 11, the latches 270 extend through the latch openings 55 and the retention pegs 278 extend through the retention openings 56. The retention plate 50 in the closed position C spreads out stress imparted to the connector assembly 1 by, for example, a pulling of the FFC 20, providing further strain relief for maintaining the electrical connection of the tabs 120 to the conductors 40 and the mechanical connection of the terminals 100 to the FFC 20.

Figure 12:
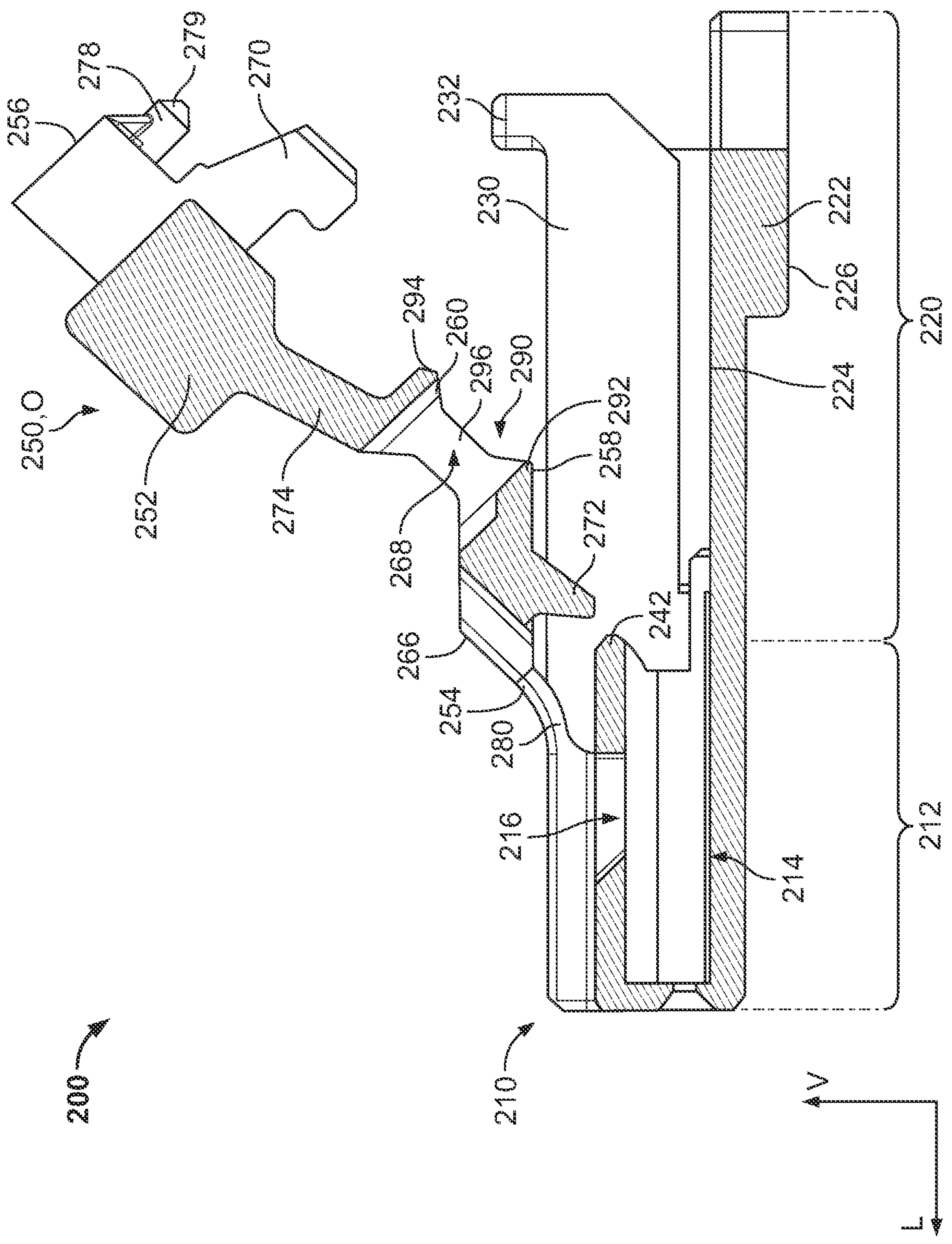
FIG. 12 is a sectional side view of a housing according to another embodiment with a cover in an open position.
Figure 13:
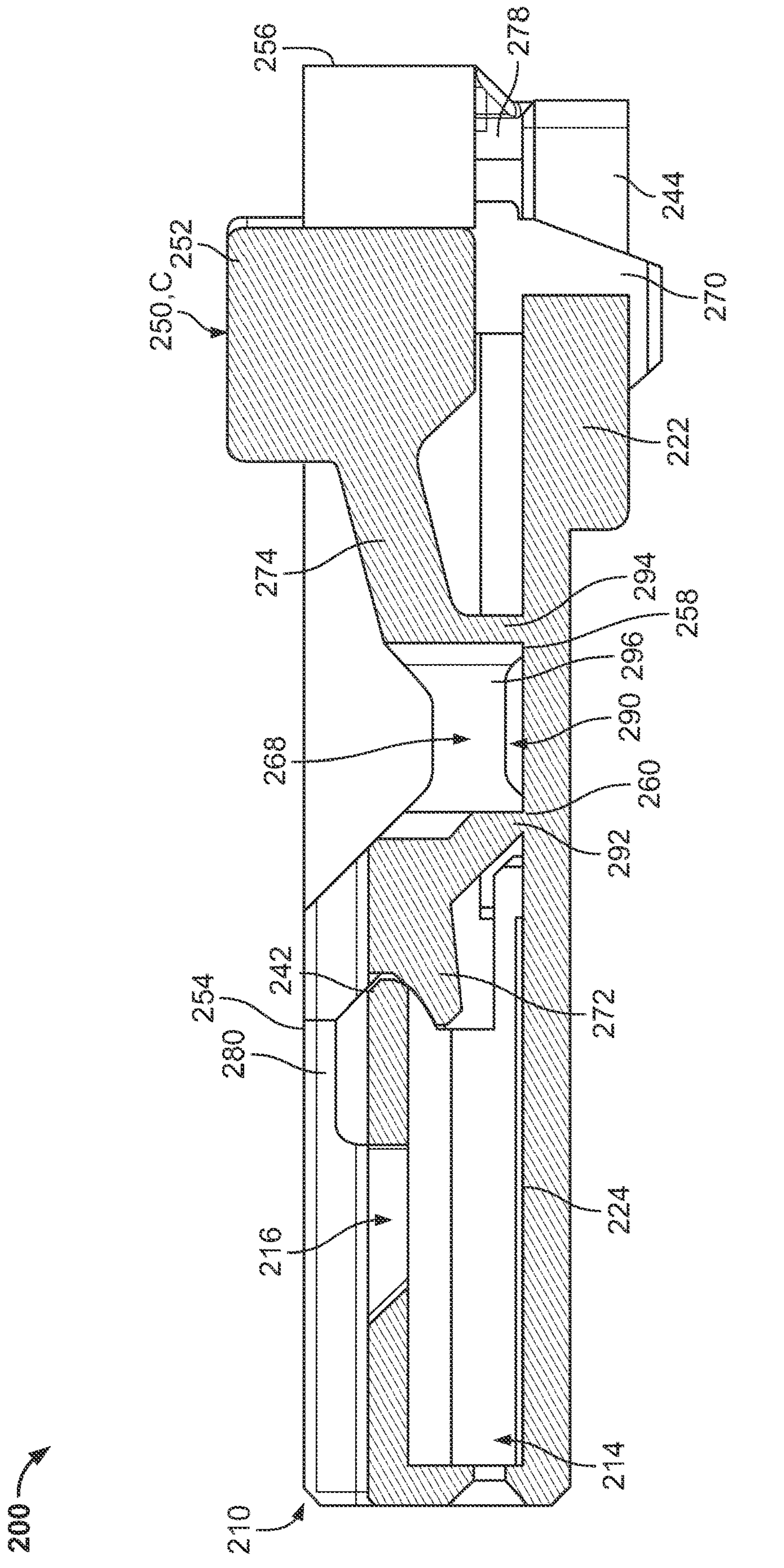
FIG. 13 is a sectional side view of the housing of FIG. 12 with the cover in a closed position.

A housing 200 according to another embodiment is shown in FIGS. 12 and 13. Like reference numbers indicate like elements, and primarily the differences from the embodiments of the housing 200 described with reference to FIGS. 1-9 will be described in detail.

In the embodiment of FIGS. 12 and 13, the main body 252 of the cover 250 of the housing 200 has the pressing surfaces 258 with separating surfaces 260 that are formed as a pressing arrangement 290 in lieu of the ribs 262 described with respect to the embodiment shown in FIG. 3. In the embodiment of FIGS. 12 and 13, the pressing surfaces 258 still have the bearing surfaces 264 described above, but they extend from the pressing arrangements 290 acting as the separating surfaces 260. The pressing arrangement 290 is disposed between the cover wedge 272 and the latch beam 274 of the cover 250 along a length of the cover 250.

As shown in FIG. 12, the pressing arrangement 290 has a first contact point 292 and a second contact point 294 protruding from the main body 252 toward the bottom wall 222 of the base 210. The first contact point 292 is disposed adjacent to the cover wedge 272 and the second contact point 294 is disposed adjacent to the latch beam 274.

The pressing arrangement 290 includes a pressing beam 296 extending between the first contact point 292 and the second contact point 294. The pressing beam 296 has a smaller or narrowed thickness as compared with a rest of the main body 252. The pressing beam 296, like the latch beam 274, is monolithically formed in a single piece with the cover 250 but is resiliently flexible, allowing some deflection of the second contact point 294 with respect to the first contact point 292. The windows 268 of the cover 250 extend through the main body 252 at a location of the pressing beam 296, alternating with the pressing beams 296 of the pressing arrangements 290 along the width direction W.

When the housing 200 is rotated from the open position O of the cover 250 shown in FIG. 12 to the closed position C of the cover 250 shown in FIG. 13, the cover wedge 272 first abuts the base wedge 242 and moves along the base wedge 242 as the cover 250 pivots about the hinge 280. The first contact point 292 then, when the terminal 100 and the FFC 20 are inserted, moves into contact with the insulation material 30 of the FFC 20 between the conductors 40. In this position, the second contact point 294 has yet to contact the insulation material 30. As the cover 250 continues to rotate toward the closed position C, the elasticity of the pressing beam 296 allows the second contact point 294 to also contact the insulation material 30 of the FFC 20. The second contact point 294 contacts the insulation material 30 before the latch 270 engages with the catch 228.

Lastly, as similarly described above with respect to FIG. 6, as the cover 250 moves into the closed position C shown in FIG. 13, the latch 270, under an elastic restoration of the latch beam 274, engages the catch 228 to secure the cover 250 with respect to the base 210. In the closed position C shown in FIG. 13, the first contact point 292 and the second contact point 294 abut the insulation material 30 of the FFC 20 and the pressing force F shown in FIG. 6 is provided by the bearing surfaces 264 to press the connection section 130 of the tab 120 toward the bottom wall 222 of the base 210. In this embodiment, the resilient flexure of the pressing beam 296 and the latch beam 274 increase the pressing force F.

What is claimed is:

1. A connector for a flat flexible cable, comprising:

a housing having a base and a cover, the base has a closed section with a receiving passageway and an open section extending from the closed section, the cover encloses the open section in a closed position of the cover, the cover has a main body with a pressing surface and a latch extending from the main body, the latch engages a catch of the base in the closed position; and a terminal disposed in the receiving passageway and having a tab extending into the open section, the pressing surface abuts the tab and presses the tab toward the base in the closed position.

2. The connector of claim 1, wherein the cover has a window extending through the cover from the pressing surface to an exterior surface of the cover opposite the pressing surface.

3. The connector of claim 2, wherein the window is aligned with the tab and exposes a surface of the tab to an area outside the connector.

4. The connector of claim 2, wherein the pressing surface includes a separating surface and a bearing surface extending at an angle from the separating surface to the window, the bearing surface abuts against the tab.

5. The connector of claim 2, wherein the main body of the cover has a latch beam disposed between the latch and the window, the latch beam is resiliently flexible.

6. The connector of claim 1, wherein the tab extends from a mating interface of the terminal, the cover has a cover wedge extending from the main body, the cover wedge abuts the mating interface and secures the terminal in the receiving passageway in the closed position.

7. The connector of claim 6, wherein the cover is movable with respect to the base between an open position exposing the open section and the closed position, the base has a base wedge extending from the closed section, the cover wedge abuts and moves along the base wedge as the cover moves between the open position and the closed position.

8. The connector of claim 1, wherein the tab has an interface section and a connection section extending from the interface section, the interface section is positioned along an interior surface of a bottom wall of the open section and the connection section is separated by a jog gap from the interior surface of the bottom wall.

9. A connector assembly, comprising:

a flat flexible cable having an insulation material and a conductor embedded in the insulation material, the conductor is exposed through a portion of the insulation material; and a connector including a housing and a terminal disposed in the housing, the housing having a base and a cover, the base has a closed section with a receiving passageway and an open section extending from the closed section, the cover encloses the open section in a closed position of the cover, the cover has a main body with a pressing surface and a latch extending from the main body, the latch engages a catch of the base in the closed position, the terminal is disposed in the receiving passageway and has a tab extending into the open section, the conductor of the flat flexible cable abuts and is electrically connected with the tab, the pressing surface presses the tab and the conductor together in the closed position, the cover has a window extending through the cover from the pressing surface to an exterior surface of the cover opposite the pressing surface, the window is aligned with the tab and exposes a surface of the tab to an area outside the connector.

10. The connector assembly of claim 9, wherein a conductive weld joint is formed between the conductor and the tab through the window.

11. The connector assembly of claim 9, wherein the conductor is disposed on a side of the tab opposite the window.

12. The connector assembly of claim 9, wherein the conductor is one of a plurality of conductors embedded in the insulation material and the terminal is one of a plurality of terminals disposed in the housing, the tab of each of the terminals is electrically connected with one of the conductors and is pressed against the one of the conductors by the pressing surface.

13. The connector assembly of claim 12, wherein the pressing surface includes a plurality of separating surfaces, the separating surfaces each abut the insulation material and press the insulation material against the base in the closed position of the cover.

14. The connector assembly of claim 13, wherein the cover has a plurality of windows extending through the cover from the pressing surface to an exterior surface of the cover opposite the pressing surface, each of the windows is aligned with one of the tabs.

15. The connector assembly of claim 13, wherein each of the separating surfaces has a pressing arrangement with a first contact point, a second contact point, and a pressing beam extending between the first contact point and the second contact point.

16. The connector assembly of claim 9, wherein the insulation material is connected by a plastic weld joint to the housing.

17. The connector assembly of claim 9, wherein the flat flexible cable has an insertion indicator marked in the insulation material, the insertion indicator aligning with a portion of the housing to indicate full insertion of the flat flexible cable into the open section.

18. The connector assembly of claim 9, further comprising a retention plate attached to the insulation material.

19. The connector assembly of claim 18, wherein the latch or a retention peg of the cover extends in the closed position through an opening of the retention plate and through an opening of the insulation material aligned with the opening of the retention plate.

20. A connector assembly, comprising:

a flat flexible cable having an insulation material and a plurality of conductors embedded in the insulation material, the conductors are exposed through a portion of the insulation material; and a connector including a housing and a plurality of terminals disposed in the housing, the housing having a base and a cover, the base has a closed section with a receiving passageway and an open section extending from the closed section, the cover encloses the open section in a closed position of the cover, the cover has a main body with a pressing surface and a latch extending from the main body, the latch engages a catch of the base in the closed position, the terminals are disposed in the receiving passageway and each have a tab extending into the open section, the conductors of the flat flexible cable each abut and are electrically connected with one of the tabs, the pressing surface presses the tabs and the conductors together in the closed position, the pressing surface includes a plurality of separating surfaces, the separating surfaces each abut the insulation material and press the insulation material against the base in the closed position of the cover.

21. The connector assembly of claim 20, wherein the cover has a plurality of windows extending through the cover from the pressing surface to an exterior surface of the cover opposite the pressing surface, each of the windows is aligned with one of the tabs.

22. The connector assembly of claim 20, wherein each of the separating surfaces has a pressing arrangement with a first contact point, a second contact point, and a pressing beam extending between the first contact point and the second contact point.

* * * * *